United States Patent Office 3,849,443
Patented Nov. 19, 1974

3,849,443
PROCESS FOR MAKING POLYMERCAPTANS
Rector P. Louthan, Bartlesville, Okla., assignor to
Phillips Petroleum Company
No Drawing. Filed Nov. 11, 1971, Ser. No. 197,922
Int. Cl. C07d 79/00
U.S. Cl. 260—327 R      6 Claims

ABSTRACT OF THE DISCLOSURE

Alpha, beta-unsaturated aldehyde compounds are reacted with hydrogen sulfide in an alcoholic solution containing sulfur and a nitrogenous base producing polymercaptans useful as epoxy resin hardeners.

By way of example, hydrogen sulfide, methanol, sulfur and anhydrous ammonia are heated under pressure and methacrolein is added to obtain a tetramer of 2-methyl-3-mercaptothiopropionaldehyde.

---

This invention relates to the production of a polymercaptan using as starting material an alpha, beta-unsaturated aldehyde compound.

In one of its concepts the invention provides a new polymercaptan which is produced by the reaction of an alpha, beta-unsaturated aldehyde compound with hydrogen sulfide in an alcoholic solution containing sulfur and a nitrogenous base.

In another of its concepts the invention provides a process for producing a new polymercaptan, suitable for use as an epoxy resin hardener by interreacting in alcoholic solution and alpha, beta-unsaturated aldehyde compound with hydrogen sulfide, sulfur and a nitrogen base.

I have now found that a reaction of an alpha, beta-unsaturated aldehyde compound with hydrogen sulfide in an alcoholic solution containing sulfur and a nitrogenous base will yield a polymercaptan suitable for use as an epoxy resin hardener.

An object of this invention is to produce a new polymercaptan. Another object of this invention is to convert an alpha, beta-unsaturated aldehyde compound to a polymercaptan. A further object of this invention is to produce a polymercaptan suitable for use as an epoxy resin hardener. A further object of this invention is to provide a relatively simple process for converting an unsaturated aldehyde compound to a polymercaptan.

Other aspects, concepts and objects of the invention, as well as the several advantages are apparent from a study of this disclosure and the appended claims.

According to the present invention, a polymercaptan is produced by reaction of an alpha, beta-unsaturated aldehyde compound with hydrogen sulfide in an alcoholic solution containing sulfur and also a nitrogenous base.

Alpha, beta-unsaturated aldehyde compounds which are suitable to the practice of this invention have the formula:

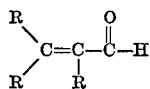

wherein each R substituent is hydrogen, alkyl or aryl. Compounds containing 4–18 carbon atoms are included. Illustrative examples of suitable alpha, beta-unsaturated carbonyl compounds are the following: acrolein, methacrolein, 3-buten-2-one, 4-phenyl, 2-hexenal, cinnamaldehyde, and the like.

Alcohols which can be used include lower molecular weight alcohols such as methanol, ethanol, n-propanol, isopropanol and n-butanol. Solvents which boil at temperatures below 100° C. such as methanol or ethanol are now preferred since these lower boiling solvents can be readily stripped from the reaction product.

Nitrogenous bases which can be used in the present process include ammonia, and amines such as methylamine, diethylamine, pyridine, morpholine, piperidine, 2-methyl-5-ethylpyridine, triethylamine, tributylamine, trimethylamine, and the like.

The invention can be practiced over the approximate temperature range of 20–150° C. with a preferred range of approximately 50–75° C.

The molar ratio of hydrogen sulfide to alpha, beta-unsaturated aldehyde reactant varies from about 2:1 to about 10:1. The amount of ammonia and sulfur required per mole of alpha, beta-unsaturated carbonyl compound varies over the range of 0.1–2.5 grams and 0.5–4 grams, respectively. Autogenous pressures are employed in the present process and suitable reaction times vary from one minute to four hours.

The practice of the present invention is described below in Example I.

EXAMPLE I

A mixture of hydrogen sulfide (363 g., 10.7 moles), methanol (150 ml.), sulfur (3.0 g.) and anhydrous ammonia (1.5 g.) was charged to a one liter autoclave. This mixture was heated to 128° F. (pressure=540 p.s.i.g.) and methacrolein [233 g. (90% purity), 3.0 moles] was pumped into the autoclave over an eighteen minute period. The reaction mixture was stirred an additional ten minutes after all the methacrolein had been added. Reaction temperature was maintained at about 135° F. by passing cooling water through the internal coil of the autoclave. The two phase reaction mixture was discharged hot and stripped at reduced pressure to obtain 353.4 grams of a viscous green liquid. On the basis of marcaptan sulfur, molecular weight, and elemental analysis (below) this reaction product corresponds to a tetramer of 2-methyl-3-mercaptothiopropionaldehyde.

|  | Calc'd for $C_{16}H_{22}S_8$ | Found |
|---|---|---|
| Molecular weight | 480.96 | 460 |
| Percent carbon | 39.95 | 40.9 |
| Percent hydrogen | 6.72 | 6.8 |
| Total sulfur | 53.33 | 51.8 |
| Mercaptan sulfur | 26.66 | 27.9 |
| Mercaptan groups/molecule | 4.0 | 4.0 |

EXAMPLE II

A sample of a Bisphenol-A type resin (e.g., the reaction product of 4,4'-isopropylidene-diphenol and epichlorohydrin) was placed between aluminum metal strips and curing was effected by the product of the instant invention. The lap shear strength of the cured specimens was determined by the method of ASTM D1002–53T. The curing was carried out by maintaining the specimen for 2 hours at 25° C., and then for 16 hours at 150° C. The lap shear strengths at 25° C. and 75° C. were found to be 1540 p.s.i. and 2500 p.s.i., respectively.

The following mixture was used in obtaining the above data:

|  | G. |
|---|---|
| Bisphenol-A type resin | 9.5 |
| Epoxy resin hardener of Example I | 5.7 |
| Tris-(2,4,6-dimethylaminomethyl)phenol | 0.1 |

The lap shear test values given herein show that the product of the present invention is useful as an epoxy resin hardener.

While a batch operation has been described, it is evident to one skilled in the chemical arts that the invention can be operated in a continuous manner.

It will also be evident to one skilled in the art having studied this disclosure that there can be made equivalent substitutions which can be determined by mere routine testing.

Reasonable variations and modification are possible within the scope of the foregoing disclosure and the appended claims to the invention, the essence of which is that an alpha, beta-unsaturated aldehyde compound has been converted into a polymercaptan suitable as a hardener for epoxy resins by reacting the same with hydrogen sulfide and sulfur in an alcohol solution and a nitrogenous base.

I claim:

1. A process for producing a polymercaptan which comprises reacting an alpha, beta-unsaturated aldehyde compound with hydrogen sulfide in solution in an alcohol boiling below about 100° C. containing sulfur and a nitrogenous base, wherein the alpha, beta-unsaturated aldehyde compound is at least one selected from the group of compounds having the formula:

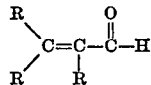

wherein each R substituent is selected from hydrogen, alkyl or aryl and wherein each R substituent is so selected that the compound contains 4–18 carbon atoms, wherein the temperature is in the approximate range 20–150° C., the molar ratio of hydrogen sulfide to the aldehyde reactant is in the approximate range of from about 2:1 to about 10:1, the nitrogenous base is ammonia in the approximate range of 0.1 to 2.5 grams and the amount of sulfur is in the approximate range of from about .5 to about 4 grams, per mole of the aldehyde reactant and recovering a polymercaptan possessing a plurality of mercapto groups.

2. A reaction according to claim 1 wherein the alpha, beta-unsaturated aldehyde compound is at least one of the following: acrolein, methacrolein, 2-hexenal, cinnamaldehyde.

3. A process according to claim 1 wherein the alcohol is at least one selected from methanol, ethanol, n-propanol, isopropanol and n-butanol and the nitrogenous base is at least one selected from ammonia, and an amine.

4. A process according to claim 3 wherein the amine is selected from methylamine, diethylamine, pyridine, morpholine, piperidine, 2-methyl-5-ethyl-pyridine, triethylamine, tributylamine, trimethylamine.

5. A process according to claim 1 wherein the approximate temperature is in the range 20–150° C. and the molar ratio of hydrogen sulfide to the alpha, beta-unsaturated aldehyde reactant is in the approximate range of from about 2:1 to about 10:1; the ammonia is in the approximate range of 0.1 to 2.5 grams and the amount of sulfur is in the approximate range of from 0.5 to about 4 grams per mole of the alpha, beta-unsaturated aldehyde compound.

6. A process according to claim 1 wherein hydrogen sulfide, methanol, sulfur and anhydrous ammonia are heated, methacrolein is added to the heated mixture and the product is tetramer of 2-methyl-3-mercaptothiopropionaldehyde.

References Cited

UNITED STATES PATENTS

| 2,212,150 | 8/1942 | Burke | 260—593 |
| 3,125,571 | 3/1964 | Chechak et al. | 260—240 |

FOREIGN PATENTS

| 623,330 | 7/1961 | Canada | 260—327 |

HENRY R. JILES, Primary Examiner

M. S. JAISLE, Assistant Examiner

U.S. Cl. X.R.

260—607 C, 609 R, 609 B, 327 T, 830 S